United States Patent [19]
Beaudet et al.

[11] Patent Number: 5,491,795
[45] Date of Patent: Feb. 13, 1996

[54] WINDOW MANAGEMENT SYSTEM WITH A HIERARCHICAL ICONIC ARRAY AND MINIATURE WINDOWS

[75] Inventors: Phillip Beaudet, Pickering; Eduardus A. T. Merks, North York; Martin Rendall, Scarborough; Roger Spall, North York, all of Canada

[73] Assignee: International Business Machines Corporation, Armonk, N.Y.

[21] Appl. No.: 236,799

[22] Filed: May 2, 1994

[30] Foreign Application Priority Data

May 4, 1993 [CA] Canada .................................. 2095448

[51] Int. Cl.$^6$ ..................................................... G06F 3/00
[52] U.S. Cl. .......................... 395/159; 395/157; 395/160
[58] Field of Search ...................... 395/155–161, 395/700, 139; 345/117–120, 131, 121

[56] References Cited

U.S. PATENT DOCUMENTS

| | | | |
|---|---|---|---|
| 4,823,303 | 4/1989 | Terasawa .............................. | 395/157 X |
| 4,868,765 | 9/1989 | Diefendorff .......................... | 395/157 |
| 4,974,173 | 11/1990 | Stefik et al. ........................ | 395/157 |
| 5,001,697 | 3/1991 | Torres ................................. | 395/157 |
| 5,072,412 | 12/1991 | Henderson, Jr. et al. .............. | 395/159 |
| 5,073,771 | 12/1991 | Satta et al. ........................... | 395/157 X |
| 5,140,677 | 8/1992 | Fleming et al. ....................... | 345/159 |
| 5,140,678 | 8/1992 | Torres ................................. | 395/159 |
| 5,146,556 | 9/1992 | Hullot et al. ......................... | 395/159 |
| 5,179,655 | 1/1993 | Noguchi et al. ....................... | 395/158 |
| 5,227,771 | 7/1993 | Kerr et al. ........................... | 395/157 |
| 5,237,653 | 8/1993 | Noguchi et al. ....................... | 395/158 |
| 5,305,435 | 4/1994 | Bronson .............................. | 395/159 |
| 5,347,628 | 9/1994 | Brewer et al. ........................ | 395/159 |
| 5,361,349 | 11/1994 | Sugita et al. ......................... | 395/157 X |

FOREIGN PATENT DOCUMENTS 1267725 10/1989 Japan .............................. G06F 3/14

OTHER PUBLICATIONS

Microsoft Windows V3.1, Microsoft Corp., 1992, Screen pp. 1–7.
Myers, "A Taxonomy of Window Manager User Interfaces", IEEE Comp. Graphics and Appl., Sep. 1988, pp. 65–84.

Primary Examiner—Mark R. Powell
Assistant Examiner—John E. Breene
Attorney, Agent, or Firm—Diana L. Roberts

[57] ABSTRACT

A user interface system is used for accessing and performing window management operations. A control window containing icons linked to product windows. Each icon in the control window is also capable of projecting a miniature window dynamically linked in terms of content and parameters to the actual information represented by the icon. Window management operations, such as moving, sizing, restoring, and closing, performed on either the iconic or miniature window representations in the control window are transmitted directly to the contents of the represented windows and implemented, whether these windows are opened or closed at the time that the operations are performed.

17 Claims, 8 Drawing Sheets

WINDOW MANAGEMENT SYSTEM WITH A
HIERARCHICAL ICONIC ARRAY AND
MINIATURE WINDOWS

BACKGROUND OF THE INVENTION

1. Field of the Invention

The present invention relates to computer user interfaces and, more particularly, to a window access and management system utilizing icons and miniature windows.

2. Description of the Related Art

An icon is a pictorial representation of an object, action, property, or some other concept on a computer display screen. Icons can be displayed within control windows to represent entire programs or files in programs. Furthermore, icons can be used to directly manipulate various operations. For example, U.S. Pat. No. 5,140,677 describes a "mini-icon" which enables a user to move or copy a document into a folder by dragging the document to the mini-icon. Similarly, U.S. Pat. No. 5,072,412 describes a displayed object (e.g., icon) which can be moved to a different workspace to regroup its associated files. U.S. Pat. No. 5,140,678 describes icons which replace common user interface symbols, such as the title window bar, command bar, and scroll bars.

U.S. Pat. No. 5,179,655 describes a displayed file window that can be completely hidden by other displayed window(s). To do this, an icon is generated and displayed as a conduit in a superordinate location of the display screen. Such a conduit enables the user to re-access the hidden window. U.S. Pat. No. 4,868,765 addresses the same issue by providing a porthole that allows the user to view portions of windows hidden behind other windows.

Another porthole or miniature window concept is described in U.S. Pat. No. 4,823,303, which provides "viewport" windows for a main file window. While one "miniature" viewport window provides an overview of the file, the other provides a close-up detailed view of a portion of the overview window.

Also, U.S. Pat. No. 5,072,412 describes a window "pictogram" which is displayed with a corresponding icon "pictogram" The window "pictogram" enables the user to view more information about the content of its corresponding displayed object without actually viewing the main window for the object. Finally, U.S. Pat. No. 4,974,173 describes "small-scale representations" or miniature windows that appear on a screen simultaneously with the main file window. The miniature windows provide a record of changes made in the file window.

A locator input device, such as a mouse, enables users to perform the previously described operations on the icons. Also, users may utilize the tab key in active windows to move the curser along a title bar to perform operations. To do this, the user presses the terminal "ENTER" key. Furthermore, the "page up" and "page down" terminal cursor keys, as well as by the mouse cursor itself, enable users to access scroll bars in window frames.

In the related art, icons merely represent pictograms of the file types or windows they denote. As such, the prior art fails to address several important problems. First, often it is desirable to provide, in a single window, a visual representation of all the windows that belong to the same application. The present invention provides a means of not only collecting together both icons and/or miniature windows, but also a means of showing various relations among them.

Second, often it is desirable to provide a convenient means of performing operations on the actual window through its representative icon or miniature window. The present invention not only provides a means for performing operations (e.g., sizing, moving, etc) on the actual window using an icon or miniature window, but these miniature window representations also dynamically maintain the state of the actual window (as opposed to maintaining a static state which must be periodically and explicitly refreshed).

SUMMARY OF THE INVENTION

The present invention is directed to a control window containing icons that permit the user to perform a number of operations on the parameters of product windows, whether or not those windows are actually open at the time the operations are registered on the icons. The present invention also provides miniature windows associated with each icon that can be displayed in the control window through which the various window operations can be performed. The miniature windows presented in this invention are dynamic and reflect the input of both control and parameter changes made directly to the associated product windows.

Accordingly, it is an object of the present invention to provide a control window container for performing window management operations in a computer system having a display, a locator input device associated with the display, and a plurality of product windows adapted for selective display in a multiple window format. The container comprises means for displaying a plurality of icons where each icon represents a separate product window, means for displaying a miniature window in association with each displayed icon, and means for linking each displayed icon to its corresponding product window. The link means permits transmission of window management operations performed by the user through the locator input device on either a displayed icon or its associated miniature window to the corresponding product window.

It is another object of the present invention to provide a method for performing file window management operations in a computer system having a display and locator input means associated with the display. The method includes the computer implemented steps of creating and displaying a control container, displaying an array of icons inside the container, where each icon represents a separate product window within the computer system, and linking the icons with their corresponding product windows to transmit window management operations from the icons to the product windows. In response to user performed operations on the icons through the locator input device, the method also provides for displaying miniature windows for selected icons within the container. In response to user performed operations through the locator input device on either the icons or miniature windows, the method provides for transmitting the window management operations for performance to the corresponding product windows.

DETAILED DESCRIPTION OF THE PREFERRED EMBODIMENTS

The present invention comprises a single control window container on a computer display containing representations of product windows or related file windows. The generic term "product window" designates both of these types of windows. The control window container enables a user to control each individual product window by using or manipulating the representations and by integrating together the individual windows. These representations include miniature windows and icons. Any suitable locator input device, such as a mouse or touch screen, enables a user to control the product window.

The term "container" refers to a window display object that contains other display objects within its frame or boundary, such as icons and miniature windows. As a window display object, standard user interface techniques (described herein) control its opening, closing, and parameters (e.g., size and location). When the displayed contents of the container overflow its established parameters, standard scrolling is available to increase its usable display area.

Figure 1:
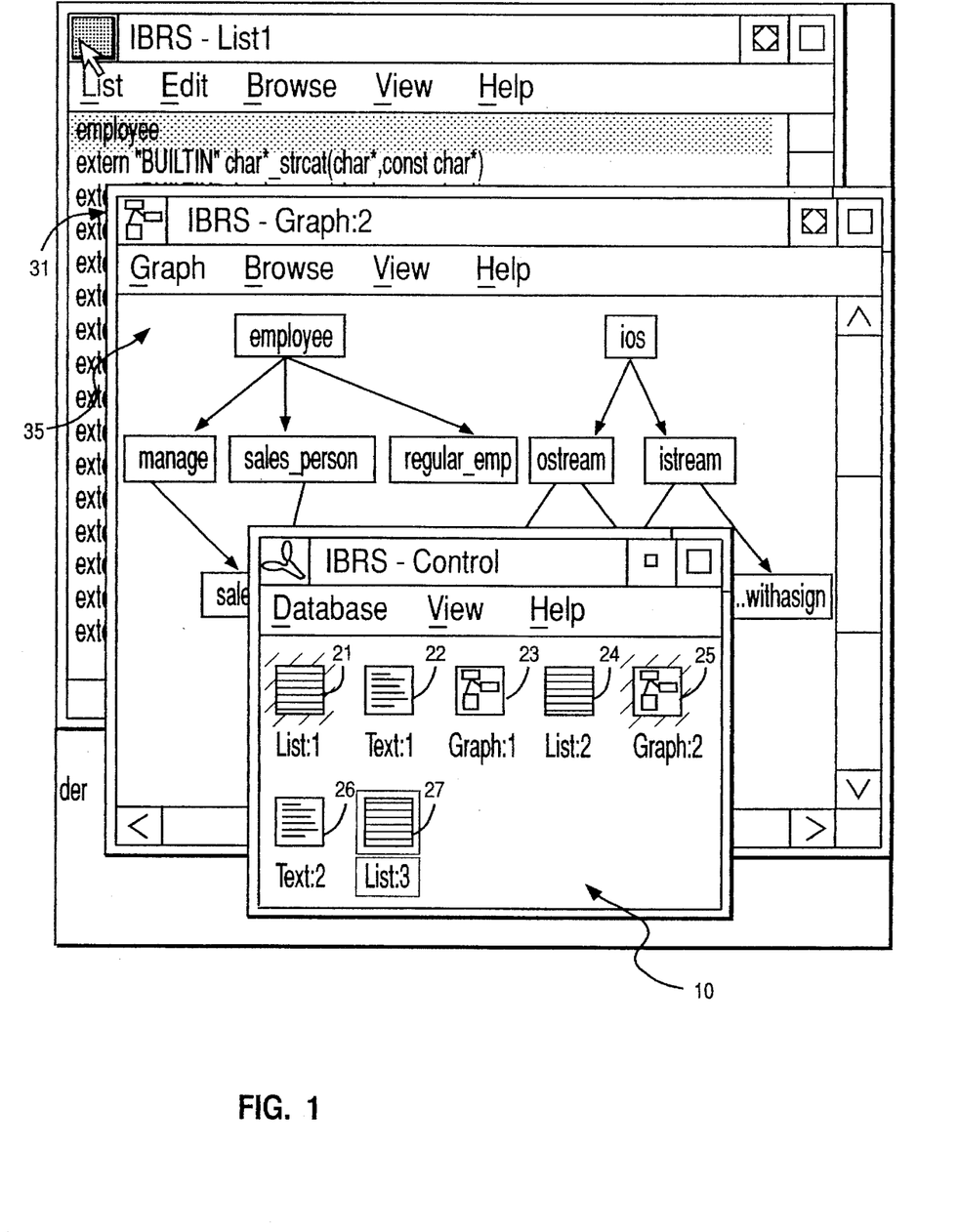
FIG. 1 is a pictorial view of a window management control window displaying a plurality of icons, in a multiple window format, according to the invention.

Referring to FIG. 1, control window 10 contains multiple icons (generally designated by numerals in the 20's). Each icon represents an open product window that can be displayed on the display screen simultaneously with the icon. Illustratively, "List:1" icon 21 represents the displayed "List:1" window 31, while "Graph:2" icon 25 represents the displayed "Graph:2" window 35. The remaining icons ("Text:1" 22, "Graph:1" 23, "List:2" 24, "Text:2" 26, and "List:3" 27) represent hidden windows. Hidden windows are windows that are not currently displayed on the display screen, but are still "open" windows in the operating system.

A visual indicator enables the user to distinguish icons representing displayed windows from those representing hidden windows. This is especially useful in avoiding user confusion when large numbers of icons are displayed in control window 10. Illustratively, both "List:1" and "Graph:2" icons 21 and 25, respectively, have a distinctive border to designate that their corresponding product windows are displayed. Alternately, other highlighting features known in the art could be utilized to indicate displayed windows.

However, the previously described visual indicator (i.e., a distinctive border) must be distinguished from another visual indicator used to denote an active icon. Active ions are illustrated as a highlighted labels (e.g., see icon 27 in FIG. 1 and icon 26 in FIG. 2). Alternately, other indicator means known in the art might be utilized to indicate active icons.

A focus area is an area which receives subsequent keyboard input. The present invention allows only one focus area in the control window and, as such, only one icon will be active (e.g., subject to the focus area) at a time. Alternately, other possible embodiments could provide for the presence of more than one focus area at a time on the display. However, numerous product windows may be simultaneously displayed in the multiple window format on the display screen. Therefore, more than one icon may be shown with a distinctive border in control window 10.

To simplify the displayed presentation, a user interface technique displays the same type of product window using a common icon symbol. For example, all "Graph" windows are represented by a common icon illustrating one graphic depiction (see icons 23 and 25 and icons 22 and 26, respectively).

In FIG. 1, the icons displayed in control window 10 are arranged horizontally by wrapping at the right hand side of the window. Another alternative shown in FIG. 2 arranges the icons displayed in control window 10a vertically from top to bottom by wrapping at the bottom of the control window. The user can alter the icon arrangement in the control window and, thus, tailor the display to suit individual preference. This can be performed either by menu selections or by drag/drop operations.

Figure 4:
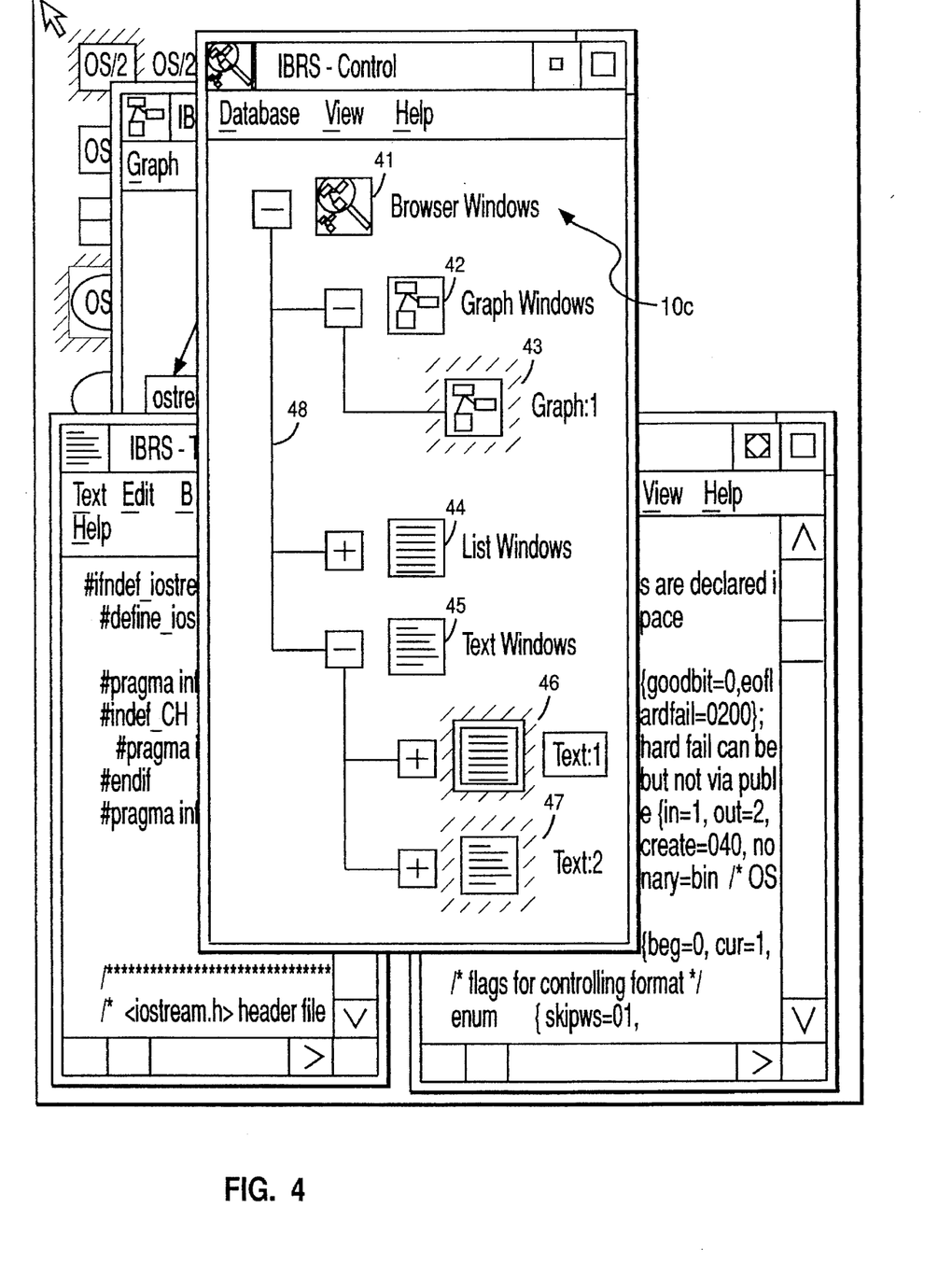
FIG. 4 is a view similar to FIG. 1, showing icons displayed in a tree hierarchy in the control window, according to another aspect of the invention.

FIG. 4 illustrates an advanced application having multiple related files or product windows. Depending on the style of display, the appropriate menu selection commands enable the user to view window 10c. Control window 10c shows the hierarchical relationship between the product windows represented by the icons. Without this feature, these relationships would not be readily apparent to the user. Each icon representing an individual product window (referred to as icon window representation) is arranged in a tree. These icon window representations are displayed as leaf nodes 42 through 47 in the tree. The root node 41 is the icon for the entire product (a browser in this illustration) denoting that all icon window representations are part of the overall product.

Icon window representations of the same type are grouped under an icon denoting that window type. Descriptive text labelling accompanies the icons to differentiate levels in the file hierarchy. Illustratively, icons 42, 44 and 45 denote a generic type of product window, while icons 43, 46 and 47 each denote specific product windows. This hierarchical display is particularly useful in object oriented technology because the hierarchical structure of the class library defines the characteristics (e.g., functions, types) of files (objects).

Figure 2:
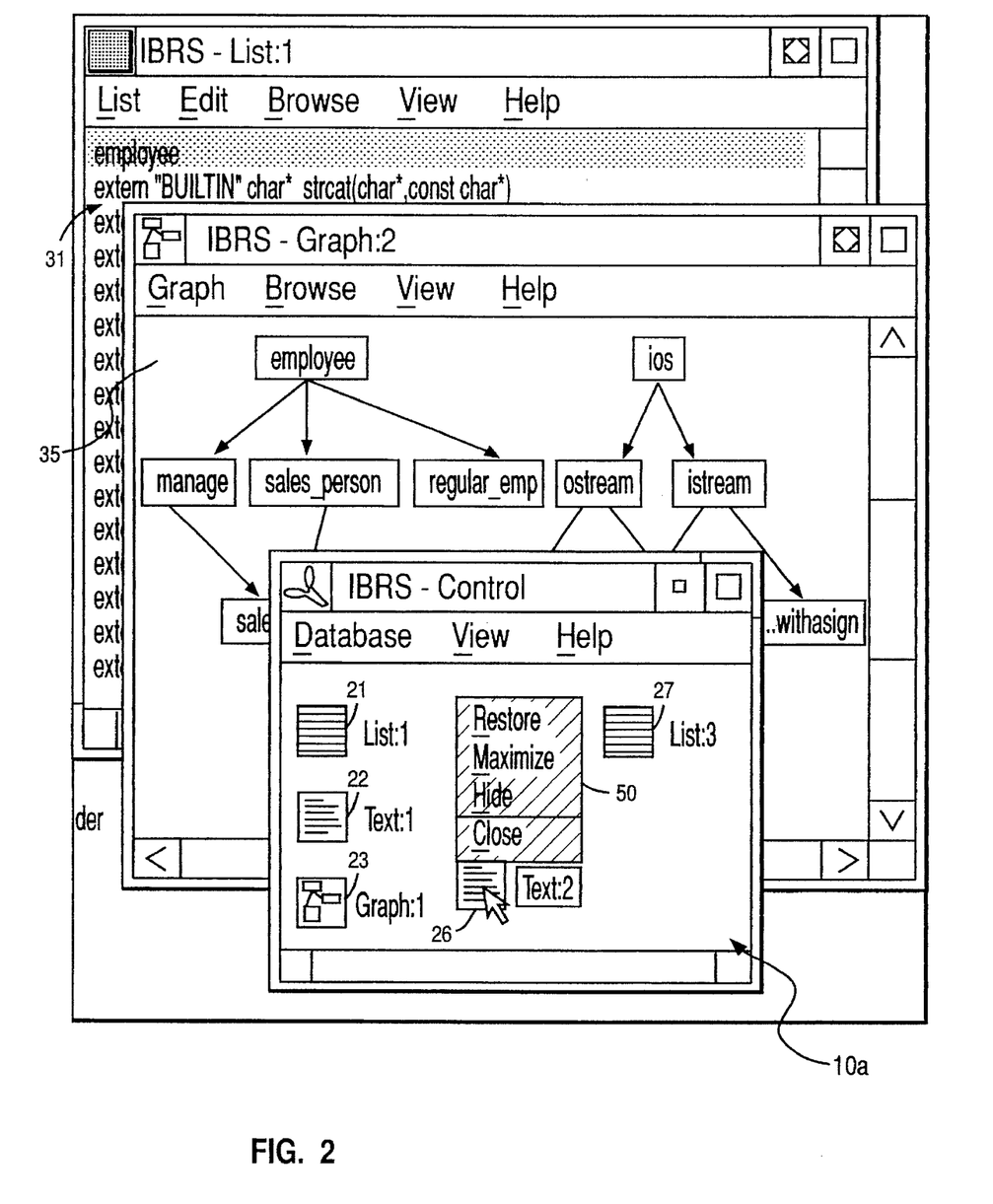
FIG. 2 is a view similar to FIG. 1, showing the control window with a pop-up menu selected on one of the icons.

Referring to FIG. 2, standard user interface techniques indicate what operations can be performed on a product window via its representative icon. Illustratively, pop-up menu 50 can be obtained by locating the mouse cursor directly on "text:2" icon 26 and single-clicking the mouse. Selection of an operation from pop-up window 50 alters the parameters of the product window. For example, pop-up window 50 lists four operations—restore, maximize, hide, and close. However, because the corresponding file window is hidden, the "Hide" operation in pop-up window 50 is "grayed out" to indicate that this operation is not currently available.

Figure 3:
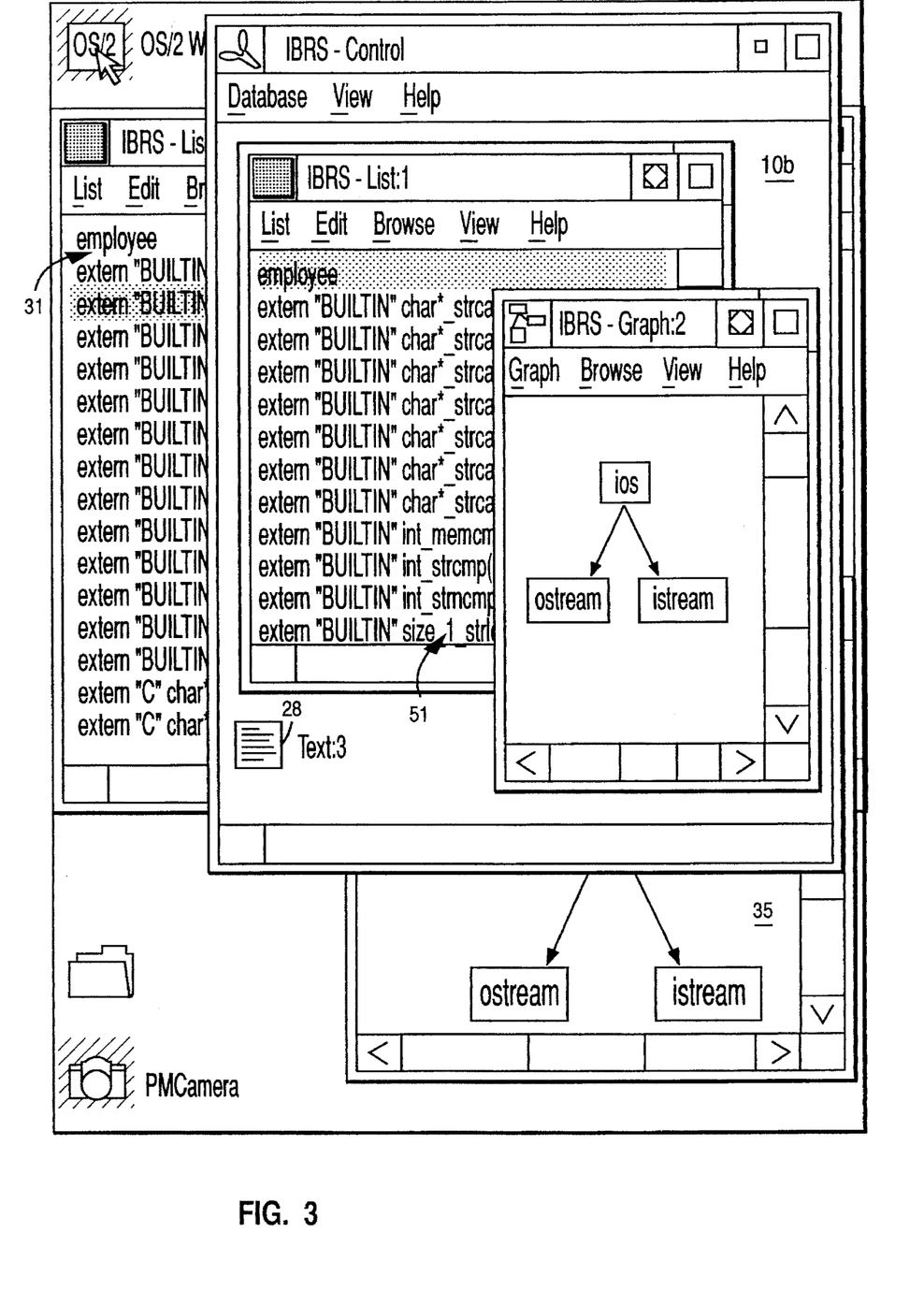
FIG. 3 is a view similar to FIG. 1, showing miniature windows constructed inside the control window, according to the invention.

File related operations can also be performed through the use of miniature windows which, like the pop-up windows, are displayed in the control window. FIG. 3 illustrates miniature windows 51 and 55 in control window 10b. Miniature window 51 corresponds to product window 31 (e.g., "List:1"), while miniature window 55 corresponds to product window 35 (e.g., "Graph:2").

A miniature window is a dynamic picture of the product window it represents, the contents and parameters of which change to reflect changes made to the product window. The contents of the miniature window cannot be directly manipulated. However, the operations that are performable on the product window's parameters can typically be performed on the miniature window's parameters. When performed on the miniature window's parameters, the same parameters of the product window are directly affected.

Such operations include those usually allowed on the individual product windows themselves, such as re-sizing, moving, minimizing, maximizing and restoring. For example, re-sizing the actual product window automatically re-sizes its corresponding miniature window. Similarly, re-sizing the miniature window automatically re-sizes its corresponding product window. This example could apply equally to other window operations, such as moving and restoring.

Possible features for the miniature windows include: (1) system and pull-down menus; (2) title bars; (3) minimize, hide, and maximize buttons; (4) minimize icons, where the product window is being minimized; (5) a miniature window denoting the product window; and (6) a scaled down version of the contents of the individual product window, which is displayed as the contents of the miniature window.

Window representations are placed in the control window according to their relative position on the entire screen. Windows can be minimized (e.g., replaced by an icon) to the contents of the control window and are represented by an "inactive" icon (i.e., absent the distinctive border). FIG. 3 illustrates an "inactive" icon 28 in control window 10b.

Figure 5:
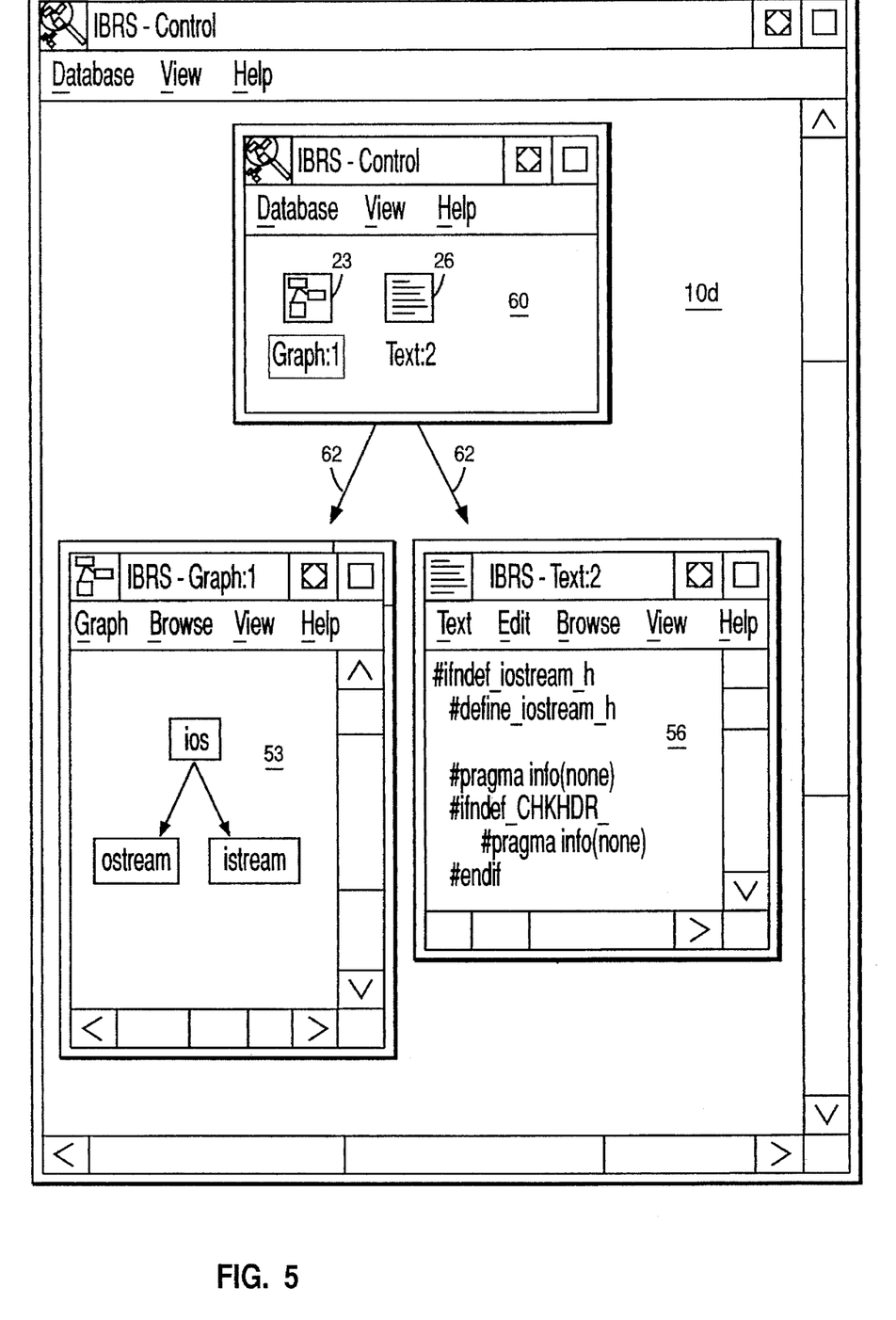
FIG. 5 is a view similar to FIG. 1, of miniature windows displayed in a tree hierarchy in the control window, according to a further aspect of the invention.

A more specialized application of the miniature window is illustrated in FIG. 5. Control window 10d displays miniature window 60 and miniature windows "Graph:1" 53 (corresponding to icon 23) and "Text:2" 56 (corresponding to icon 26). These miniature windows are derived from the hierarchical format shown in FIG. 4.

Referring again to FIG. 5, these miniature windows are further derived from downwardly directed arrows 62 connecting miniature window 60 to miniature windows 53 and 56. This illustrates the hierarchical relationship between the actual product windows represented by the miniature windows. In other words, miniature window 60 is the miniature window representing browser control icon 41 (the overall product in this example). Therefore, miniature window 60 is the superclass for each of the "Graph:1" and "Text:2" files, which are represented by their icons 43 and 47, respectively, in FIG. 4 and by their miniature windows 53 and 56, respectively, in FIG. 5.

Figure 6A:
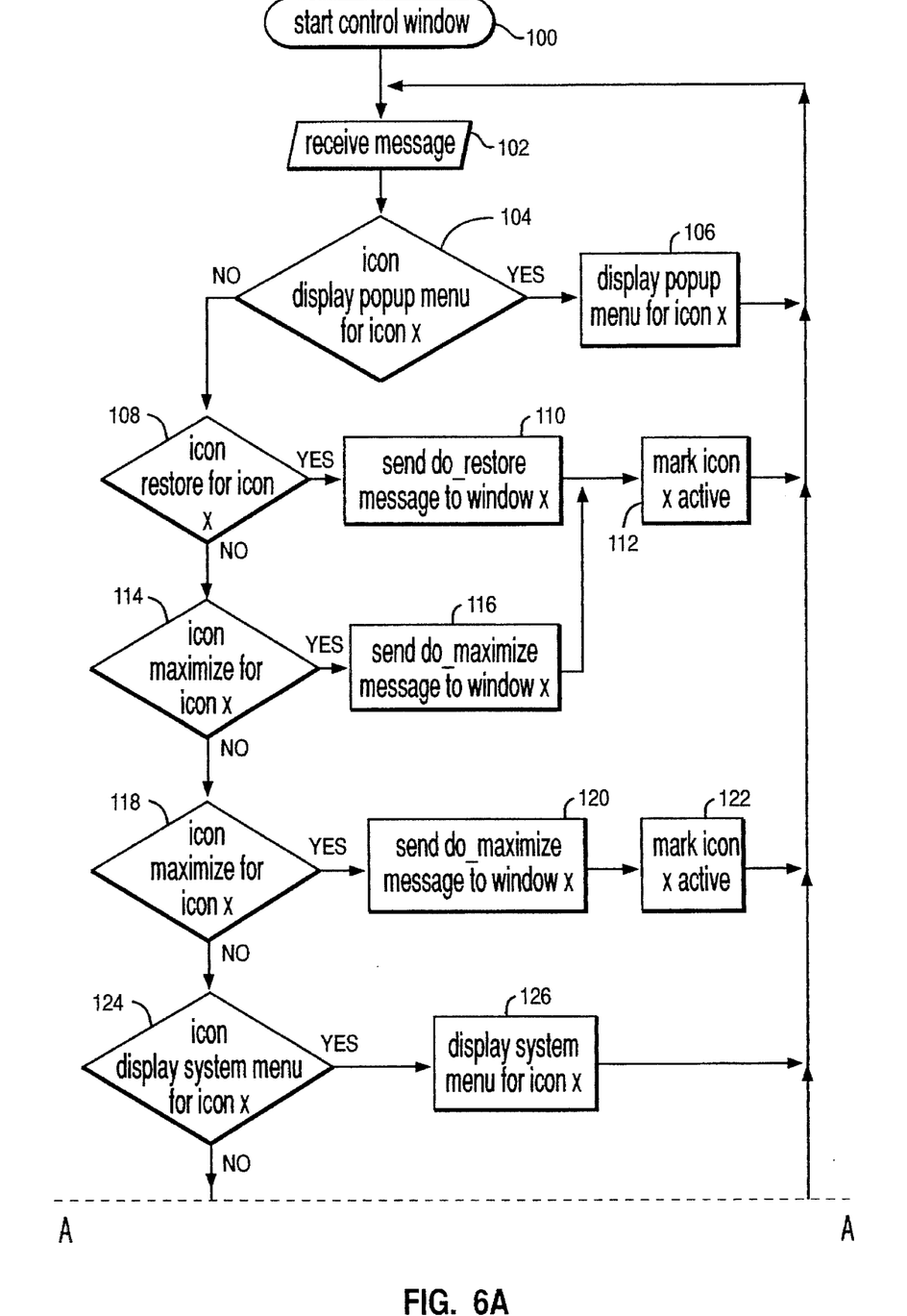
FIG. 6 is a flow diagram setting forth the computer implemented steps for display and management of the control window.
Figure 6B:
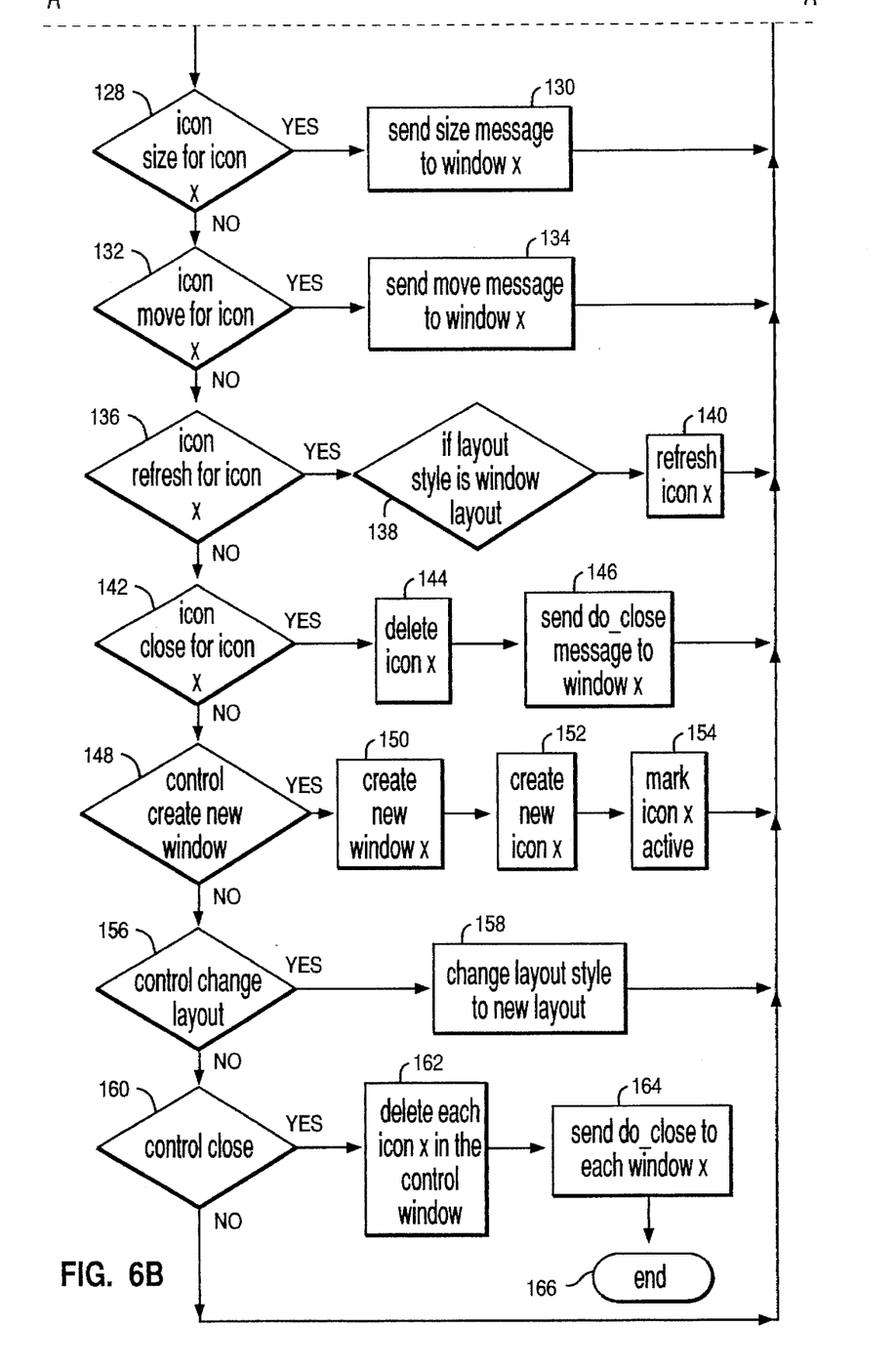

The flow diagram of FIG. 6 illustrates the numerous window management operations that can be performed through icons or miniature windows in the control window. For simplicity, the term "icon" is used throughout the flow diagram, but it should be noted that many of the same operations can be implemented through miniature windows displayed on their corresponding icons and the preferred embodiment covers this extended application.

On starting a control window for a particular product (block 100), links are established with all open product windows (whether displayed or hidden). A control window having linked icons thereon is displayed at block 102.

In using the control window, if the user selects an option to display a pop-up menu for a particular icon "x" at block 104, the computer displays the pop-up menu at block 106. Operations from the pop-up menu include "icon restore" at block 108, "icon maximize" at block 114, and "icon minimize" at block 118.

The "icon restore" operation (block 108) displays the product window represented by the icon at block 110. Further, it implements an "active" visual indicator (e.g. a border) on the icon to show that its product window is displayed (block 112).

The "icon maximize" operation (block 114) either maximizes the size of a displayed product window or displays the product window directly at its maximum size (block 116). If the icon is not already marked as active (i.e. window open border), execution of this operation causes the border to appear (block 112).

The converse operation is "icon minimize" (block 118) that hides the associated file window at block 120, without closing or terminating the link between the control window and the product window. On hiding its associated product window, the icon is marked as inactive at block 122. That is, the indicator border is removed.

The "display system menu" operation (block 124) relates specifically to miniature window use. This operation displays the system menu for the product window (block 126) from the title bar of the associated miniature window. The system menu allow window manipulation operations. This system menu contains the standard window operations shown in the flow diagram of FIG. 7, such as "restore" (block 204), "maximize" (block 208) and "minimize" (block 212) and permits performance of these operations on the product window through implementing the locator input device on the specific operation displayed in the miniature window.

Other operations performable on the miniature window that directly affect the parameters of the corresponding product window include sizing (block 128) and moving (block 132). For example, performing a change of size operation (block 128) directly changes the size of the corresponding product window if displayed, or is recorded in the hidden product window's parameters (block 130). Similarly, performing a "move icon" operation (block 132) moves the corresponding displayed product window on the display screen (block 134). If the product window is hidden, then the miniature window would be an icon and, therefore, move are not possible.

In order to remove the link between the control window and the product window, the "icon close" operation (block 142), which can be implemented through either the icon or miniature window, deletes the icon from the control window (block 144) and removes the product window, if displayed, or simply severs the link between the control window and the product window so that the product window can no longer be accessed (block 146).

The "icon refresh" operation (block 136) causes the miniature window displaying the contents of a product window to be refreshed and, thus, reflects any changes made to those contents (block 138). This operation involves copying a suitably transformed image of the product window's contents into the "contents" of the miniature window (block 140).

Operations that have a direct effect on the control window itself include creating new file windows (block 148), changing the layout of icons in the control window (block 156) and closing the control window (block 160). When adding a new product window, the "control create new window" operation (block 148) establishes a link between control window 10 and the new product window (i.e., creates a new product window in relation to the control window—block 150). Furthermore, it establishes a new icon in the control window that represents the new window (block 152) and provides the visual representation of the link between the control window and the new product window. The new icon is immediately marked as active in the focus area (block 154).

As is known, icons in the control window can be rearranged simply by pressing the mouse button and dragging each icon to the desired location. Either this manual method or pre-programmed arrangements can be effected through an operation for "control change layout" (block 156), which causes computer implementation of the layout change (blocks 158 and 102).

The "control close" (block 160) operation closes the control window, deleting the icons from the display (block 162) and severing links with the various product windows (block 164) to exit the control window program (block 166).

Figure 7:
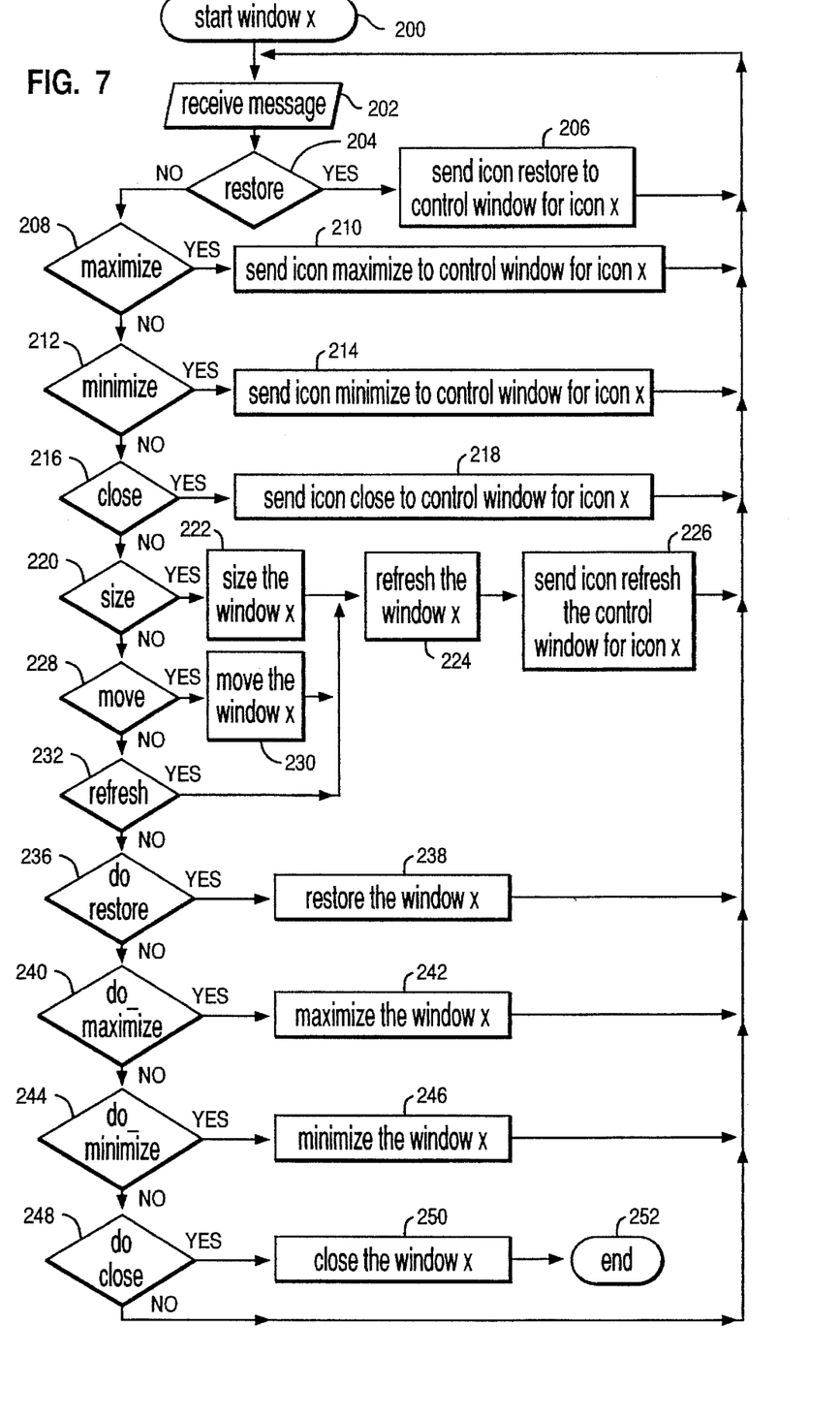
FIG. 7 is a flow diagram setting forth the computer implemented steps for effecting window management operations through product windows interacting with icons contained in the control window.

FIG. 7 sets forth computer implemented operations in a product window represented in the control window by either an icon or a miniature window.

The operation to start a product window (block 200) sends a message to establish a link (for passing window management operations) between the control window and the new product window (block 202). Once the link has been established, the following operations can be performed on the product window through its representative icon in the control window:

1. The "restore" operation (block 204) displays the product window and sends an "icon restore" command (block 206) to the control window. In turn, the control window receives and executes the "icon restore" command (blocks 108 and 110 in FIG. 6), thereby marking the icon as "active" (block 112 in FIG. 6);

2. The "maximize" operation (block 208 in FIG. 7) sends an "icon maximize" command to the control window (block 210). In turn, the control window receives and executes the "icon maximize" command (blocks 114 and 116 in FIG. 6) to display, if necessary, and maximize the size of the product window, while also marking the icon as "active" (block 112 in FIG. 6);

3. The "minimize" operation (block 212 in FIG. 7) sends an "icon minimize" command to the control window (block 214). In turn, the control window receives and executes the "icon minimize" command (blocks 118 and 120 in FIG. 6) to hide the product window corresponding to icon "x" and mark icon "x" as "inactive" (block 122); and 4. The "close" operation (block 216 in FIG. 7) sends an "icon close" command (block 218) to close out the product window, delete the icon representing the file, and sever the link between the control window and the product window (blocks 142, 144 and 146 in FIG. 6).

Operations performed directly on the product window parameters alter the parameters of the miniature window in the control window. These operations include changing the size of the product window (blocks 220 and 222 in FIG. 7) and changing the location of the product window (blocks 228 and 230). After these operations, the product window is refreshed (block 224), as well as the corresponding icon (block 226 in FIG. 7 leads to blocks 136, 138 and 140 in FIG. 6). Any changes to the product window generate a "refresh" operation (block 232). The "refresh" operation also updates the corresponding miniature window.

Finally, as previously described, operations performed on a miniature window affect the parameters of its corresponding product window. Illustrations of these operations are shown in FIG. 7. However, other operations would be obvious modifications to one skilled in the art, such as: (1) the "do_restore" operation (block 236), which opens the product window from the control window (block 238); (2) the "do_maximize" operation (block 240), which increases the size of the product window from the control window (block 242); and (3) the "do_minimize" operation (block 244), which closes the product window (block 246).

This "do_minimize" operation can also be performed directly on the product window as a "do_close" operation (block 248) to close the product window (block 250) and end (block 252).

Provision of a single control window containing icons and miniature windows representing multiple file windows has been particularly shown and described in relation to the concept of a single product where the multiple file windows are related. However, modifications to the described preferred embodiments will be obvious to one skilled in the art and are intended to be covered by the following claims.

We claim:

1. A control container for performing window management operations in a computer system having a display and locator input device, said container comprising:

means for arranging a plurality of icons in a displayed hierarchical array, each displayed icon representing a separate product window, wherein said array contains a first icon;

means for receiving a window management operation on said first icon from said locator input device; and first means for linking said first icon to said product window to enable transmission of said window management operation to said product window.

2. The control container according to claim 1 further comprising:

a miniature window displayed on said display representing said product window;

means for receiving a window management operation on said miniature window from said locator input device; and a second means for linking said miniature window to said product window to enable transmission of said window management operation to said product window.

3. The control container according to claim 2, wherein said miniature window comprises contents that reflect contents in said product window, and said contents of said miniature window cannot be directly manipulated.

4. The control container according to claim 2, wherein said second linking means comprises means for refreshing contents of said miniature window to display changes effected directly in said product window.

5. The control container according to claim 2, wherein said second linking means comprises means for receiving operations transmitted from said product window for performance altering contents of said miniature window.

6. The control container according to claim 5, wherein the second linking means further comprises means for receiving operations transmitted from said product window for performance altering parameters of said miniature window.

7. The control container according to claim 1, wherein said first linking means is bi-directional for transmitting changes effected directly in said product window to said control container.

8. The control container according to claim 1 further comprising first indicator means for highlighting said first icon when said product window is displayed.

9. The control container according to claim 8 further comprising second indicator means for highlighting said first icon when said first icon actively transmits window management operations to said product window.

10. The control container according to claim 1, wherein said first linking means comprises means for hiding said product window from said control container.

11. The control container according to claim 1, wherein said first linking means comprises means for altering a size of said product window from said control container.

12. The control container according to claim 1, wherein said first linking means comprises means for altering a location of said product window.

13. A method for controlling a computer system having a display and locator input means associated with the display, comprising the steps of:

creating and displaying a control container on said display;

arranging a plurality of icons in a displayed hierarchical array, each displayed icon representing a separate product window, wherein said array contains a first icon;

receiving a window management operation on said first icon from said locator input means; and linking said first icon to said product window to enable transmission of said window management operations to said product window.

14. The method according to claim 13 further comprising the steps of:

displaying a miniature window for said first icon within said control container;

receiving a window management operation on said miniature window from said locator input device; and linking said miniature window to said product window to enable transmission of said window management operation to said product window.

15. The method according to claim 14, wherein said steps of displaying within said container said miniature window further comprises:

dynamically linking displayed contents and parameters of said miniature window with said product window for transmitting operations performed directly on said product window to said miniature window.

16. The method according to claim 13 further comprising means for highlighting said first icon in said control container corresponding to said displayed product window.

17. The method according to claim 13 further comprising means for highlighting said first icon in said control container when said first icon actively transmits window management operations to said product window.

* * * * *